(12) United States Patent
Pejhan (10) Patent No.: US 8,498,520 B2
(45) Date of Patent: Jul. 30, 2013

(54) VIDEO ENCODING AND TRANSMISSION TECHNIQUE FOR EFFICIENT, MULTI-SPEED FAST FORWARD AND REVERSE PLAYBACK

(75) Inventor: Sassan Pejhan, Princeton, NJ (US)

(73) Assignee: VBrick Systems, Inc., Wallingford, CT (US)

( * ) Notice: Subject to any disclaimer, the term of this patent is extended or adjusted under 35 U.S.C. 154(b) by 1636 days.

(21) Appl. No.: 11/492,586

(22) Filed: Jul. 25, 2006

(65) Prior Publication Data

US 2007/0025688 A1  Feb. 1, 2007

Related U.S. Application Data

(60) Provisional application No. 60/702,817, filed on Jul. 27, 2005.

(51) Int. Cl.
*H04N 5/783* (2006.01)
*H04N 5/92* (2006.01)

(52) U.S. Cl.
USPC ............ 386/343; 386/326; 386/345; 386/347

(58) Field of Classification Search
USPC .................. 386/68, 109, 326–352; 375/240, 375/240.04, 240.05, 240.06, 240.07, 240.12, 375/240.13, 240.15
See application file for complete search history.

(56) References Cited

U.S. PATENT DOCUMENTS

| | | | | |
|---|---|---|---|---|
| 5,652,823 A | * | 7/1997 | Eto ................................. | 386/68 |
| 6,201,927 B1 | * | 3/2001 | Comer ........................... | 386/314 |
| 6,621,979 B1 | * | 9/2003 | Eerenberg et al. ............. | 386/68 |
| 7,072,571 B2 | * | 7/2006 | Suzuki ............................ | 386/68 |
| 7,231,132 B1 | * | 6/2007 | Davenport ...................... | 386/68 |
| 7,233,621 B2 | * | 6/2007 | Jeon ........................ | 375/240.15 |
| 2007/0133942 A1 | * | 6/2007 | Moors et al. .................... | 386/68 |

* cited by examiner

Primary Examiner — Hung Dang
(74) Attorney, Agent, or Firm — Alix, Yale & Ristas, LLP (57) ABSTRACT

A video system and process in which a series of video frames are encoded for fast forward and/or fast reverse playback, wherein a subset of frames are encoded as reference frames that have a hierarchical relationship with each other. The reference frames are I frames and predicted frames, such as P, B, or IDR frames.

10 Claims, 8 Drawing Sheets

| SERIAL FRAME | FRAME TYPE | SERIAL PARENT | 16 FRAME GROUPS | | | FRAME TYPE | SERIAL PARENT | 32 FRAME GROUPS | | | |
|---|---|---|---|---|---|---|---|---|---|---|---|
| | | | 2X FRAMES | 4X FRAMES | 8X FRAMES | | | 2X FRAMES | 4X FRAMES | 8X FRAMES | 16X FRAMES |
| 0 | — | N/A | # | # | # | — | N/A | # | # | # | # |
| 1 | P | 0 | # | | | P | 0 | | | | |
| 2 | P | 0 | | # | | P | 0 | # | | | |
| 3 | P | 2 | # | | | P | 2 | | | | |
| 4 | P | 0 | | # | | P | 0 | # | # | | |
| 5 | P | 4 | # | | | P | 4 | | | | |
| 6 | P | 4 | | # | | P | 4 | # | | | |
| 7 | P | 6 | # | | | P | 6 | | | | |
| 8 | P | 0 | | # | # | P | 0 | # | # | # | |
| 9 | P | 8 | # | | | P | 8 | | | | |
| 10 | P | 8 | | # | | P | 8 | # | | | |
| 11 | P | 10 | # | | | P | 8 | | | | |
| 12 | P | 8 | | # | | P | 12 | # | # | | |
| 13 | P | 12 | # | | | P | 12 | | | | |
| 14 | P | 12 | | # | | P | 14 | # | | | |
| 15 | P | 14 | # | | | P | 0 | | | | |
| 16 | — | N/A | | | | P | 16 | # | # | # | # |
| 17 | P | 16 | | | | P | 16 | | | | |
| 18 | P | 16 | | | | P | 16 | # | | | |
| 19 | P | 16 | | | | P | 16 | | | | |
| 20 | P | 20 | | | | P | 20 | # | # | | |
| 21 | P | 20 | | | | P | 20 | | | | |
| 22 | P | 22 | | | | P | 22 | # | | | |
| 23 | P | 16 | | | | P | 16 | | | | |
| 24 | P | 24 | | | | P | 24 | # | # | # | |
| 25 | P | 24 | | | | P | 24 | | | | |
| 26 | P | 26 | | | | P | 26 | # | | | |
| 27 | P | 24 | | | | P | 24 | | | | |
| 28 | P | 28 | | | | P | 28 | # | # | | |
| 29 | P | 28 | | | | P | 28 | | | | |
| 30 | P | 30 | | | | P | 30 | # | | | |
| 31 | P | | | | | P | | | | | |

FRAME GROUP SEGMENTS

FIG. 8B

| | | 16 FRAME GROUPS | | | | 32 FRAME GROUPS | | | | |
|---|---|---|---|---|---|---|---|---|---|---|
| SERIAL FRAME | FRAME TYPE | SERIAL PARENT | 2X FRAMES | 4X FRAMES | 8X FRAMES | FRAME TYPE | SERIAL PARENT | 2X FRAMES | 4X FRAMES | 8X FRAMES | 16X FRAMES |
| 32 | I | N/A | # | # | # | I | N/A | # | # | # | # |
| 33 | P | 32 | # | | | P | 32 | # | | | |
| 34 | P | 32 | # | # | | P | 32 | # | | | |
| 35 | P | 34 | # | | | P | 34 | | | | |
| 36 | P | 32 | # | # | # | P | 32 | # | # | | |
| 37 | P | 36 | # | | | P | 36 | | | | |
| 38 | P | 36 | # | # | | P | 36 | # | | | |
| 39 | P | 38 | # | | | P | 38 | | | | |
| 40 | P | 32 | # | # | # | P | 32 | # | # | # | |
| 41 | P | 40 | # | | | P | 40 | | | | |
| 42 | P | 40 | # | # | | P | 40 | # | | | |
| 43 | P | 42 | # | | | P | 42 | | | | |
| 44 | P | 40 | # | # | # | P | 40 | # | # | | |
| 45 | P | 44 | # | | | P | 44 | | | | |
| 46 | P | 44 | # | # | | P | 44 | # | | | |
| 47 | P | 46 | # | | | P | 46 | | | | |
| 48 | I | N/A | # | # | # | P | 32 | # | # | # | # |
| 49 | P | 48 | # | | | P | 48 | | | | |
| 50 | P | 48 | # | # | | P | 48 | # | | | |
| 51 | P | 50 | # | | | P | 50 | | | | |
| 52 | P | 48 | # | # | # | P | 48 | # | # | | |
| 53 | P | 52 | # | | | P | 52 | | | | |
| 54 | P | 52 | # | # | | P | 52 | # | | | |
| 55 | P | 54 | # | | | P | 54 | | | | |
| 56 | P | 48 | # | # | # | P | 48 | # | # | # | |
| 57 | P | 56 | # | | | P | 56 | | | | |
| 58 | P | 56 | # | # | | P | 56 | # | | | |
| 59 | P | 58 | # | | | P | 58 | | | | |
| 60 | P | 56 | # | # | # | P | 56 | # | # | | |
| 61 | P | 60 | # | | | P | 60 | | | | |
| 62 | P | 60 | # | # | | P | 60 | # | | | |
| 63 | P | 62 | # | | | P | 62 | | | | |
| 64 | I | N/A | # | # | # | — | N/A | # | # | # | # |

VIDEO ENCODING AND TRANSMISSION TECHNIQUE FOR EFFICIENT, MULTI-SPEED FAST FORWARD AND REVERSE PLAYBACK

RELATED APPLICATION

This application claims priority under 35 U.S.C. §119(e) from Provisional Application No. 60/702,817 filed Jul. 27, 2005 for Video Encoding and Transmission Technique for Efficient, Multi-Speed Fast Forward and Reverse Playback.

FIELD OF INVENTION

This invention relates in general to video compression, and more particularly to fast forward and reverse playback.

BACKGROUND OF THE INVENTION

Given the ever-increasing proliferation of digitized video, there is a strong desire to have the same type of controls as one has with devices that play analog video. These controls include Play, Stop, Pause, Fast Forward, Reverse, and Play. Our focus here is on Fast Forward and Reverse Play mode.

Implementing Fast Forward and Reverse Play is trivial for uncompressed digital video, as well as compressed video employing Intra-coding methods (I-Frames) only. In both of these cases, Fast Forward can simply be implemented by skipping frames: e.g. a 3× Fast Forward speed can be achieved simply by decoding and displaying every third frame, but at the full frame rate of the video stream. Similarly, Fast Reverse play at 2× speed can be implemented by decoding and displaying every other frame, but in the reverse direction.

Raw digital video, particularly at high resolution, requires enormous amounts of storage (and bandwidth in case of transmission), however. Even Intra-coded video streams consume far more storage and bandwidth than is available in most applications. As a result, digital video is almost always stored and transmitted using a combination of intra-frame and inter-frame predictive encoding techniques. Inter-frame prediction methods, however, greatly complicate the implementation of Fast Forward and Reverse Play mechanisms.

Figure 1:
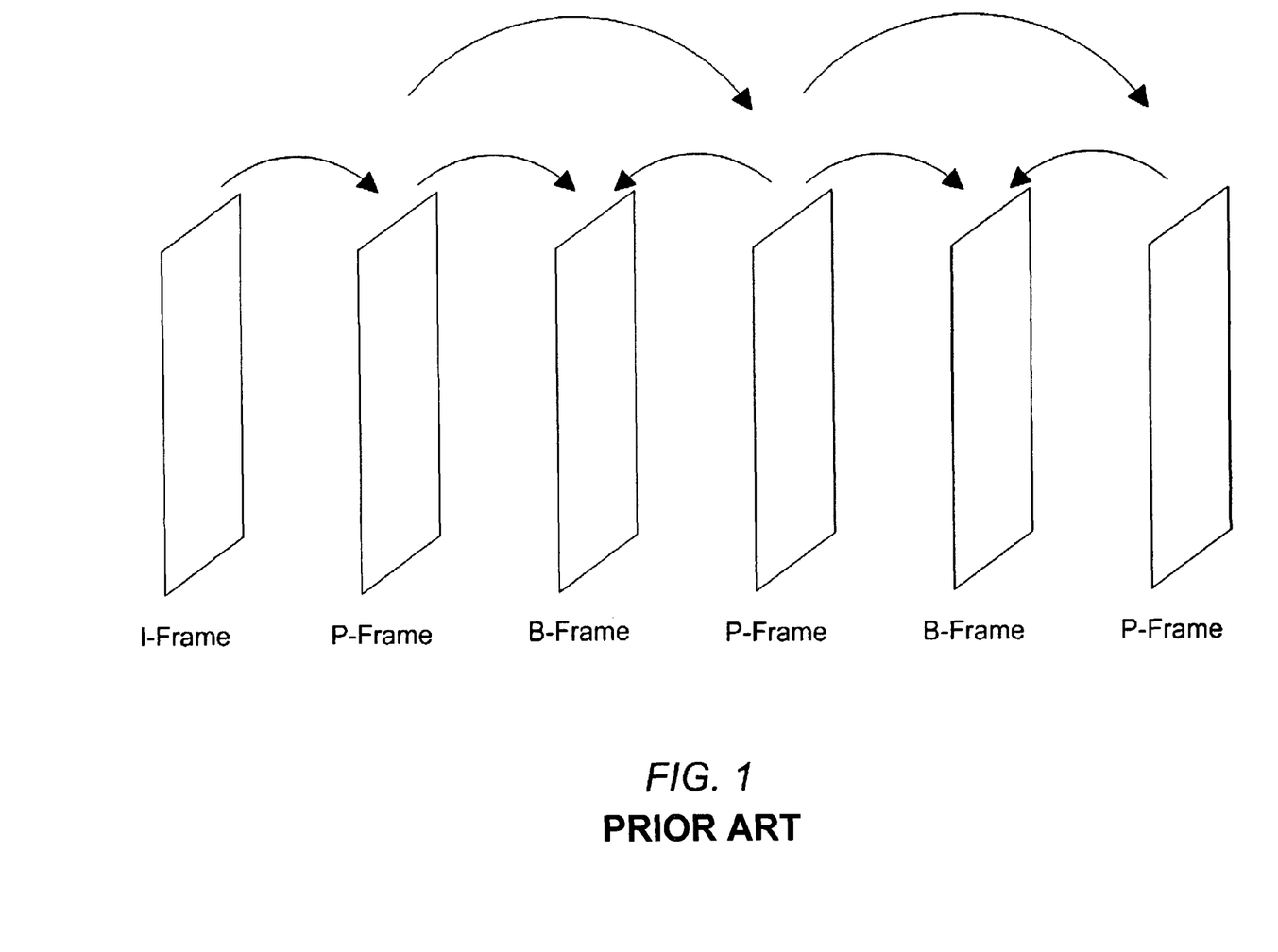
FIG. 1 illustrates a sequence of frames encoded in a conventional fashion.

The major video coding standards developed over the past 20 years (H.261, H.263, MPEG-1, MPEG-2 and MPEG4) are all based on the same basic principles. Each frame of video can be encoded as one of three types: Intra-coded (I) frames, Predicted (P) frames and Bi-directionally predicted (B) frames. The I-frames achieve compression by reducing spatial redundancy. The P-frames are predicted from a preceding I- or P-frame, as shown in FIG. 1. Using motion estimation techniques, each 16×16 MacroBlock (MB) in a P-frame is matched to the closest MB of the frame from which it is to be predicted. The difference between the two MBs is then computed and encoded, along with the motion vectors. As such both temporal and spatial redundancy is reduced. B-frames are coded similar to P-frames except that they are predicted from both past and future I- or P-frames (see FIG. 1).

I-frames are much larger than P or B frames, but they have the advantage of being decodable independent of other frames. P and B frames achieve higher compression ratios, but they depend on the availability of other frames in order to be decoded.

This interdependence between frames has a serious implication for Fast Forward mechanism based on frame skipping: if a frame is skipped, then the next frame cannot be decoded and so on until an I-Frame is reached. Many implementations of Fast Forward work on the principle of transmitting only the I-Frames. I-Frames, however, are often few and far apart (since they consume too many bits), so this technique would only yield a very crude and coarse Fast Forward effect.

A brute force method to produce a Fast Forward effect is to decode and display a video clip faster than its natural frame rate. If a clip is encoded at 30 fps but is transmitted, decoded and displayed at 60 fps, the user will see the clip at twice the natural speed, resulting in a 2× Fast Forward effect. The disadvantages of this technique are twofold: to run the clip at rates that are significantly higher than the standard 30 fps a powerful processor is required, particularly for high resolution images. Moreover, in the case of streaming video, the bandwidth consumption would increase in proportion to the Fast Forward speed: running a 500 kbps clip at four times its natural frame rate would require 2000 kbps of bandwidth. In short, this scheme is not scalable.

In T.-G. Kwon, Y. Choi and S. Lee, "Disk Placement for Arbitrary-Rate Playback in an Interactive Video Server", Multimedia Systems Journal, Vol. 5, No. 4, pp. 271-281, 1997 and M.-S. Chen, D. Kandlur, P. Yu, "Support for Fully Interactive Playout in a Disk-Array-Based Video Server", Proceedings of ACM Multimedia '94, pp. 391-398, San Francisco, Calif., October 1994, the authors divide the video clip into independently decodable segments (typically a Group of Pictures or GOP). Fast Forward is then implemented by sampling the segments: 3× Fast Forward, for instance, is achieved by sending every 3rd segment. While, on the average, only one third of the frames are transmitted and displayed, this scheme results in a non-uniform 'poor man' s' Fast Forward effect: if a segment is one second long, then the viewer will see a one second clip at normal speed, followed by a jump of two seconds in the video clip.

Perhaps the main advantage of B-frames is that they can be skipped without affecting the decoding of other frames since B-frames are not used as reference frames (except in the case of H.264, as detailed below). Thus, B-frames can be used to achieve temporal scalability, which in turn allows for Fast Forward through frame skipping. For instance, if every other frame in a digital video clip is encoded as a B-frame, then 2× Fast Forward can be achieved by dropping the B-frames, and decoding and playing back the remaining frames at the natural frame rate of the video clip.

In order to achieve a broad range of Fast Forward speeds, however, more and more B-frames have to be used. To achieve both 2× and 4× Fast Forward, 3 out of 4 frames have to be B-frames. To achieve 2×, 4× and 8× speeds, 7 out of 8 frames will have to be encoded as B-frames and so on. As a larger and larger percentage of frames are encoded as B-frames, there will be fewer and fewer reference frames, however, and they will be far in between. This large temporal distance between reference frames (and the B-frames that will use them as references) will result in a large drop in coding efficiency.

The use of B-frames to achieve Fast Forward effect will have the following deficiencies: Encoder complexity is increased due to doubling of Motion estimation process. Compression efficiency is reduced due to larger temporal distances between encoded and reference frames. Many encoders employ profiles (such as MPEG4 SP and H.264 Baseline) that do not even allow the use of B-frames. Encoder latency is increased as more and more B-frames are used in a GOP. This may not matter for off-line encoding, but for cases where the video stream is both viewed live and recorded for archival purposes (such as a videoconferencing session), latency will become an issue.

Finally, as described in A. Srivastava, A. Kumar and A. Singru, "Design and Analysis of a video-on-demand Server", Multimedia Systems Journal, Vol. 5 No. 4, pp. 238-254, 1997, Fast Forward operation can be achieved by storing multiple versions of the same video clip, each encoded at a different frame rate. When Fast Forward operation is desired, the video server, or client application in case of local files, can switch to a stream encoded at a lower frame rate but transmit (or, in the case of player, decode and display) it at the full frame rate. In H.264/MPEG-4 AVC, the latest video encoding standard, new frame types called SI and SP frames have been introduced. SI and SP frames are 'switching' frames which enable seamless switching between two different encoded bitstreams, including multiple versions of the same video. This is described in M. Karcewicz and R. Kurceren, "The SP- and SI-Frames Design for H.264/AVC", IEEE Transactions on Circuits and Systems for Video Technology, Vol. 13, No. 7, pp. 637-644, July 2003.

Having multiple versions of a stream, however, introduces its own problems: such as increased storage requirements, the need for multiple encoding of the video (not practical for live encoding), and increased complexity at VOD server due to the need to switch between multiple streams, including on the fly generation of the SI and SP frames.

SUMMARY OF THE INVENTION

A video encoding method selects reference frames for encoding predicted frames in a hierarchical (pyramid) fashion. Multiple-speed fast forward effect is obtained by selective (transmission in case of streaming and) playback of the encoded frames. Initially, non-reference frames (those at the 'base' of the pyramid) are dropped. Higher fast forward speeds are then achieved by dropping frames at subsequently higher layers of the pyramid.

This can be summarized as a series of video frames encoded for fast forward and/or reverse playback, wherein a subset of frames are encoded as reference frames that have a hierarchical relation with each other.

As stored in a server or the like, one embodiment is directed to a series of compressed video frames encoded for playback or transmission as cyclic patterns of frame groups each consisting of an intra-coded (I) frame followed by a contiguous sequence of predicted frames derivable from a reference frame that is either an I frame or a predicted frame, wherein the improved encoding for playback or transmission at any integral multiple of a basic fast forward speed has the reference frames in a hierarchical relation with each other that depends on the basic fast forward speed.

Preferably, the actual playback frame rate (frames per second) is the nominal rate at which the original uncompressed images were captured. The fast forward or fast reverse speed is a visual effect resulting from the transmission and/or playback of only a subset of all the encoded frames.

Using the concept of "generalized B-frames" introduced in the MPEG4 Part 10/H.264 standard, the stream can be additionally encoded as a hierarchy of backward predicted frames. Multiple speed reverse playback can then be obtained by applying the same mechanism described on this second encoded stream. To reduce on storage space, the two streams may share the same Intra coded frames.

The present invention has various embodiments, including as a computer implemented process, as computer apparatuses, as integrated circuits, and as computer program products that execute on general or special purpose processors.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWING

Representative embodiments of the invention will be described with reference to the accompanying drawing.

DETAILED DESCRIPTION OF THE PREFERRED EMBODIMENTS

Figure 2:
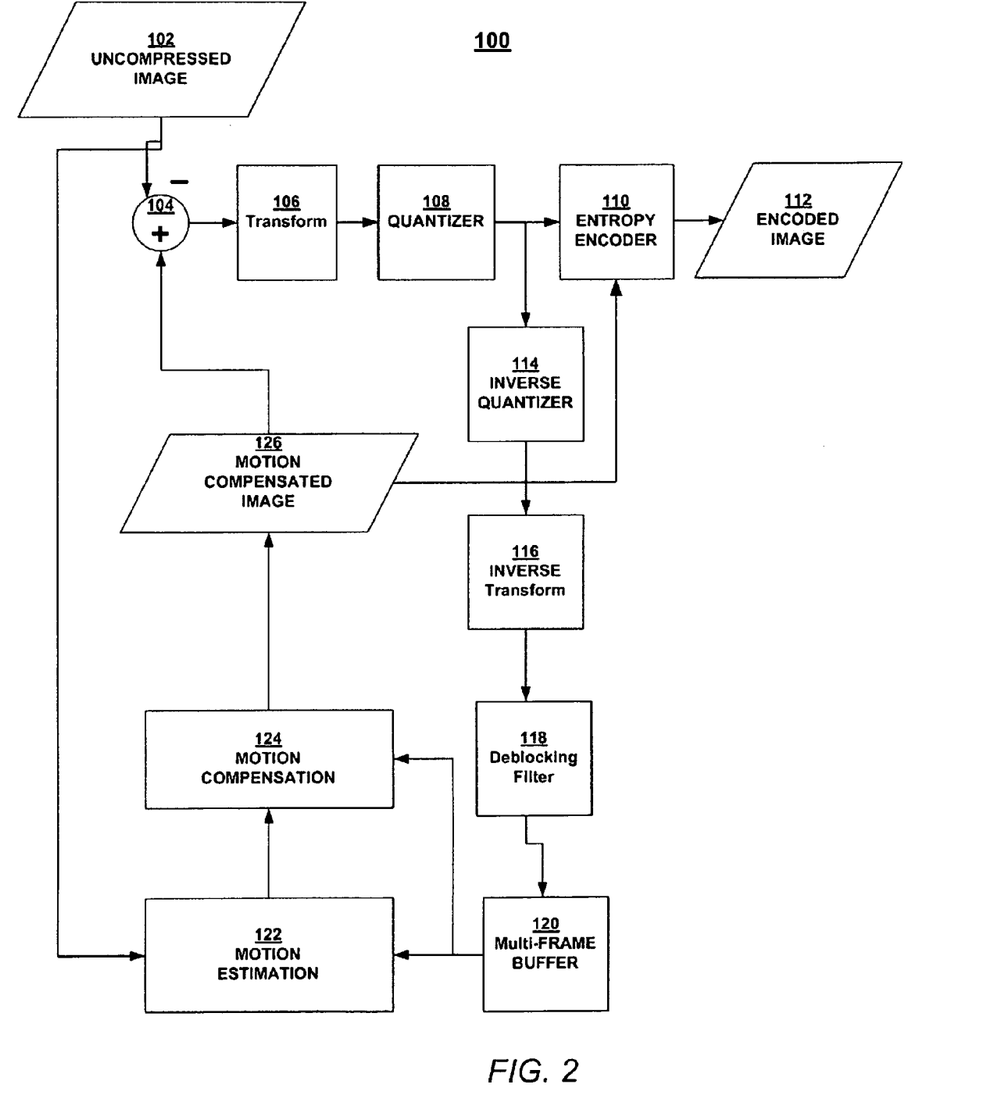
FIG. 2 is a block diagram of a hybrid video encoder.

Referring now to FIG. 2, there is shown a block diagram of an encoder 100 according to one embodiment of the present invention. The encoder 100 can be implemented in hardware, software, or a combination thereof. The encoder 100 generally operates according to principles of an MPEG4 video encoder as described in ISO/IEC 14496 or similar hybrid Motion Compensation/DCT encoder, with the additional features and structures as further described below. The encoder 100 is used to encode a video sequence that comprises a plurality of uncompressed images 102. The image 102 data comprises a plurality of macroblocks, each macroblock having either 4:x:x sample format of luminance and chrominance data, depending on the implementation.

The type of image (equivalently "frame" or "picture" or "slice") will be one of an intra-picture (I), a forward predicted picture (P), or a bi-directional predicted (B) picture. Intra-pictures (I-pictures) are coded without reference to other pictures contained in the video sequence. In older video compression standards such as MPEG-1 and MPEG-2, Inter-frame predicted pictures (P-pictures) are coded with reference to the nearest previously coded I-picture or P-picture, usually incorporating motion compensation to increase coding efficiency. In H.264/MPEG4 AVC, different blocks within a P-slice may refer to blocks in different, previously coded I-slices or P-slices. Bi-directionally predicted frames (B-pictures) may use both past and future frames as references. To achieve high compression, motion compensation can be employed based on the past and future P-pictures or I-pictures.

The encoder 100 uses different encoding processes depending on the type of the image. P and B type frames are encoded as follows. The image macroblocks are input into both subtractor 104 and motion estimator 122. The motion estimator 122 determines for each macroblock a motion vector, using motion estimation algorithms, where the motion vector represents the horizontal and vertical displacement from the current macroblock being encoded to the matching macroblock in the reference picture. When completed for all of the macroblocks in the current image, the result is a set of motion vectors corresponding to the macroblocks of the current image. Each macroblock will be also coded as either a forward predicted (P), backward predicted (B), weighted average predicted (W), intra (I), or skip (S) block, depending on the motion vector information for the block, if any, and the frame type. For a B frame, motion predicted blocks will be either P or B blocks, depending on the reference picture used for the particular macroblock; otherwise, the blocks will be I or S blocks. For a P frame, the blocks will be either P, S, or I blocks. These motion vectors data and block information are passed to the motion compensation stage 124, which applies them to the reference image(s) to create a motion compensated image 126.

The motion compensated image 126 is then subtracted from the original image 102 by subtractor 104 to produce a set of error prediction or residual signals for each macroblock (in practice this step takes place on macroblock by macroblock basis directly following motion estimation). This error prediction signal represents the difference between the predicted image and the original image 102 being encoded. In the case that the original image 102 is a B- or P-picture, the motion compensated image 126 is an estimation of the original image 102. In the case that the original image 102 is an I-picture, then the motion compensated image 126 will have all pixel values being equal to zero, and the quantized DCT coefficients represent transformed either pixel values or error prediction signal between the current block and a previously encoded block in the current frame. For I frames, the quantized coefficients are used to reconstruct the I frame as a reference image via inverse quantizer 100 and inverse DCT 118. The reconstructed image is stored in frame buffer 120.

One of the advantages of the very latest video encoding standards, such as H.263++ and H.264, over the earlier standards named above is that they allow more flexibility in the choice of reference frames. Specifically, frames are no longer restricted to using the most immediately preceding I-Frame or P-frame as a predictor. Rather, they are free to choose any previously encoded frame as a predictor.

This added flexibility could be exploited to implement a new technique for Fast Forward operation that has none of the disadvantages of the techniques described in the background section above, while providing a broad range of speeds for Fast Forward operation.

Figure 3:
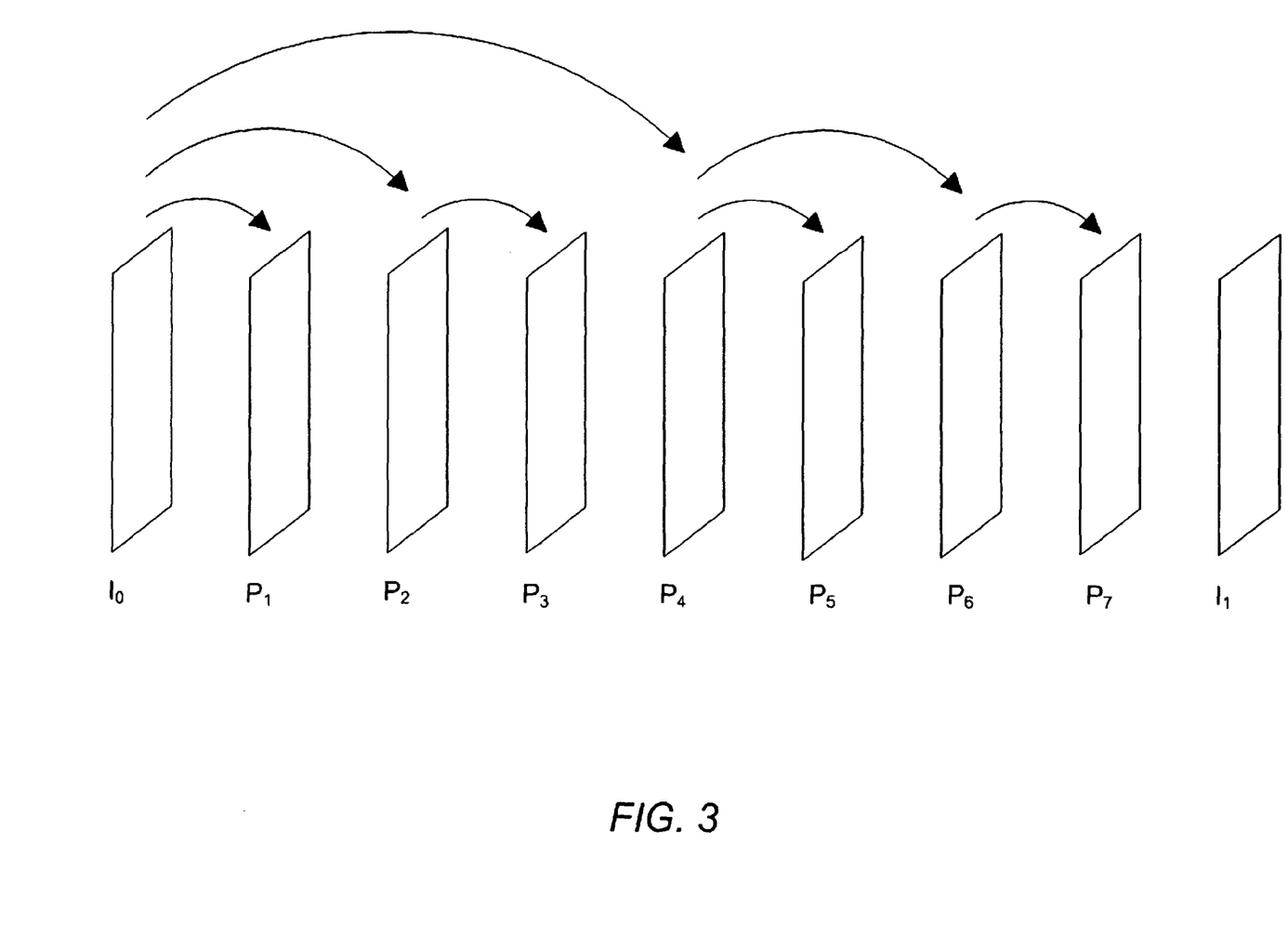
FIG. 3 illustrates a sequence of frames encoded in a power of two in a hierarchical manner according to one embodiment of the invention.

The present invention discloses such a technique. It calls for the encoding mechanism to follow specific patterns in the selection of reference frames. An example of such patterns is depicted in FIG. 3 where a GOP structure that is 8 frames long is illustrated. As shown in FIG. 3, the first frame in the GOP is encoded in Intra mode. All odd numbered frames use the immediately preceding even numbered frame as their reference. Frames 2 and 6 use frames 0 and 4 respectively as their reference—i.e. their reference frame is 'two frames ago'. Finally, frame 4 uses frame 0—four frames ago—as its reference.

Figure 4:
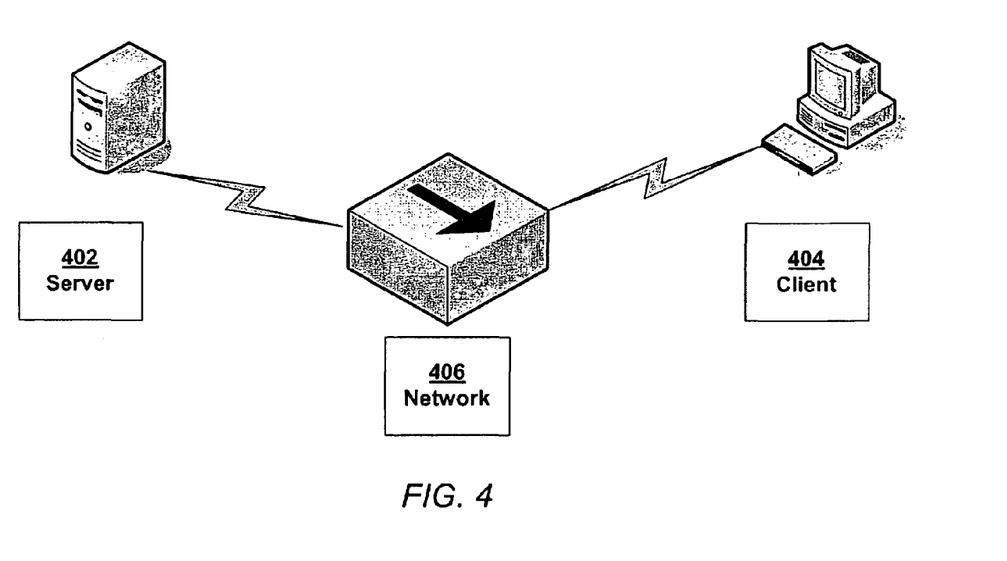
FIG. 4 illustrates a generic client and video server connected over a network.
Figure 5:
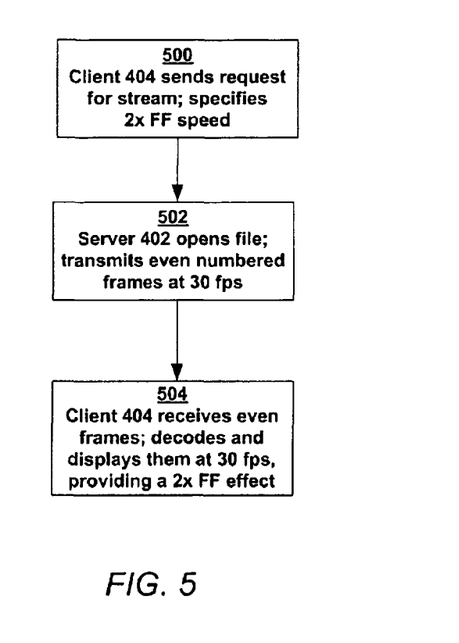
FIG. 5 is a flowchart illustrating the process for Fast Forward playback at 2× speed.

With such an encoding mechanism, multiple Fast Forward speeds can be obtained through simple frame skipping. A typical client-server set-up is shown in FIG. 4 where the two are connected over a network. Referring now to FIG. 5, there is shown a flowchart of the communication between client and server to obtain a 2× Fast Forward playback effect. Suppose that a video file, compressed at 30 frames per second (fps) is stored on the video server 402. The client 404 sends a request to the server 402, specifying the stream it desires, as well as the playback mode (2× fast forward). The server 402 will open the appropriate file but only transmit the even frames. This is possible since modern file formats, particularly those based on the ISO Base Media File Format specified in ISO/IEC 14496-12, provide the server with both the size of each frame as well as its location within the compressed bitstream. The server 402 will transmit 30 even frames in each second. The client 404 receives the even frames and decodes and displays 30 of them each second. Since the 30 even frames represent, in reality, a time period of two seconds, a 2× fast forward speed is achieved by displaying these 30 frames in a one second period.

Similarly, 4× fast forward speed is obtained by dropping 3 of four frames (and only keeping frames that are numbered as a multiple of 4), while 8× speed can be obtained by dropping all P frames. Higher powers of 2 speeds can be obtained by skipping I-frames (as in the all Intra-coded schemes described in the background section).

The pattern shown in FIG. 3 is one embodiment of the present invention, used to illustrate the logic behind the present invention. In this example, the high frequency of I-frames (one every 8 frames) causes a loss in coding efficiency. A more practical pattern would extend this example to one where the GOP length is 32 frames (i.e. every 32nd frame is Intra coded). As before, all powers of 2 Fast Forward speeds can be obtained through frame skips.

Figure 6:
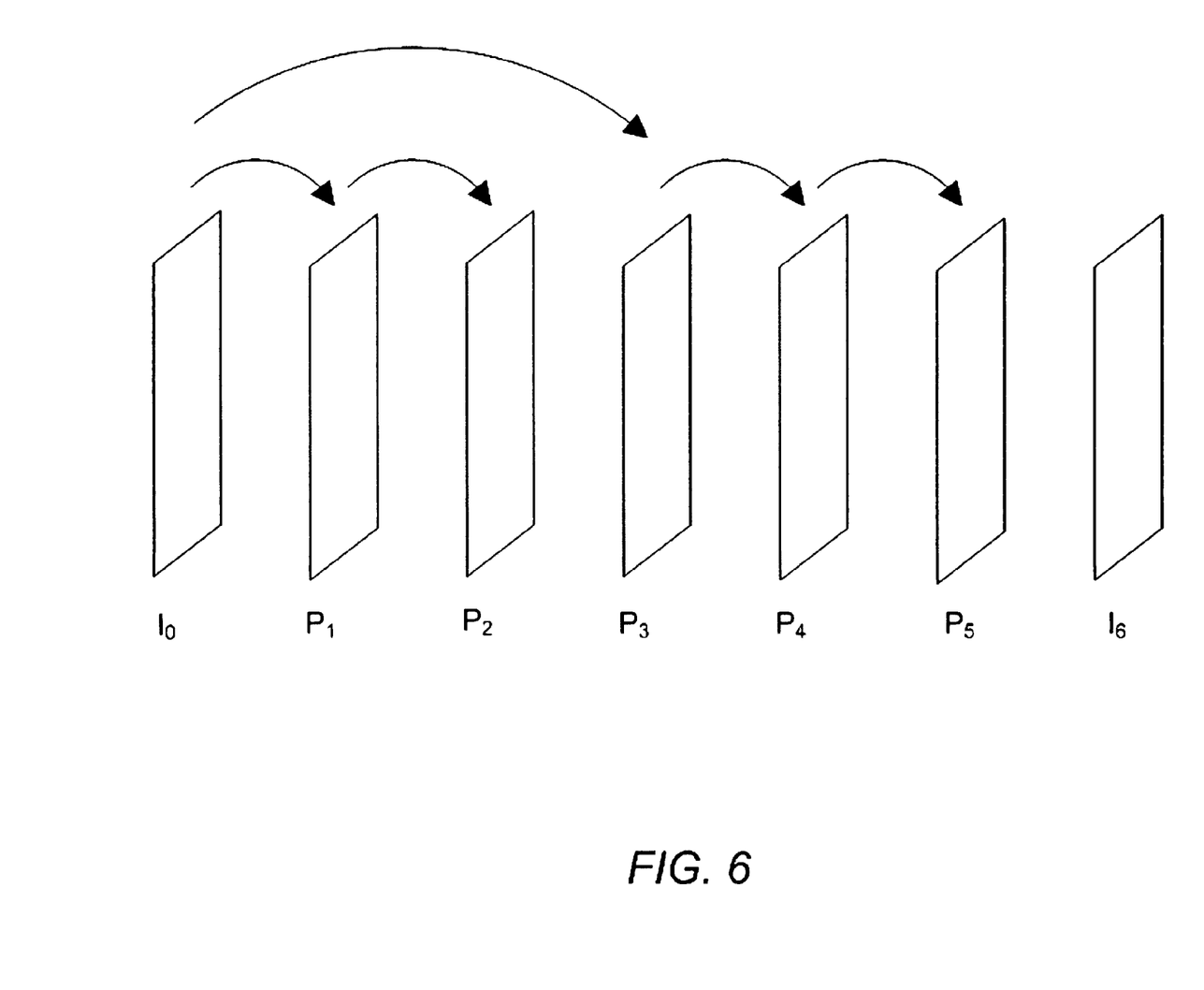
FIG. 6 illustrates a sequence of frames encoded in a power of three hierarchical manner.

The present invention is not limited to speeds that are a power of 2 multiple of the natural frame rate. FIG. 6 illustrates a pattern than enables 3×, 6×, . . . Fast Forward speeds. Moreover, even a 2× Fast Forward speed can be achieved in the pattern shown in FIG. 6: 2 out of 3 frames can be dropped but the remaining frames can be sent at twice their natural speed, and not 3 times. This is particularly useful in cases where bandwidth is a concern. Typically, dropping half the frames (almost always B-frames, or P-frames in the case of this invention) and transmitting the remaining half at 2× speed actually results in an increase in the bandwidth used. This is because the remaining frames contain a higher ratio of I-Frames, and hence contain more than 50% of the bits. Dropping 2 out of 3 frames and transmitting the remainder at 2× speed will alleviate this problem, at the expense of losing temporal resolution (10 fps instead of 15 fps).

The present invention has the following advantages:

An infinite range of Fast Forward speeds can be obtained from a single encoded bitstream; hence there is no need for multiple streams or multiple encodings.

By the same token, there is no need for switching between bitstreams.

The scheme can be implemented with or without the use of B-frames (including the "generalized B-frames" in H.264).

There is very moderate loss in coding efficiency (e.g. frame 4 in FIG. 3 will be less efficiently coded because of the temporal difference between it and frame 0), but this is much less than the loss suffered by all Intra-coding methods, or those using long strings of B-frames in between reference frames.

A true Fast Forward effect is obtained with uniform temporal distance between all frames.

A compressed video clip residing on a Video Server can be accessed by different clients, with different capabilities in terms of available bandwidth and processing resources. The ability to produce a scalable encoded video bitstream, using a single-pass encoding mechanism, is highly desirable in video-on-demand applications because it will be able to cater to the needs of different clients using the same bitstream. Selected frames are sent at a speed that is a multiple of their natural rate in order to achieve a Fast Forward effect.

Implementing Reverse Play mechanism for video streams encoded using Inter-prediction has been even more challenging than Fast Forward mechanisms. The simplest, but least efficient, method for implementing Reverse Play is to transmit and decode (but not display) all the frames in a GOP up until the frame to be displayed, and then display all the decoded frames in the GOP in reverse order. The main drawback is that many decoded frames (up to the full number of frames in a GOP) will have to be stored in memory. This would be impractical in cases where the GOP size is large and/or the video is of a high resolution. An alternative approach is to decode but not store the intermediate frames. While this saves on memory, it will require many frames to be decoded several times, thereby wasting CPU cycles—an even more precious resource.

The most common approach used to implement Reverse Play is to store two encoded versions of each video clip: one encoded in the forward direction, the other encoded in Reverse direction (which would require off-line encoding). Operations such as regular Play and Fast Forward are then performed on the forward encoded file while Reverse Play and Fast Reverse are performed on the reverse encoded file.

The embodiment described above can be extended to both the forward encoded stream and the reverse encoded stream. In other words, the same hierarchical mechanism for selection of reference frames can be applied to the reverse encoded stream in order to achieve multi-speed Reverse Play mechanism.

One of the disadvantages of the approach with two independently encoded streams is that it doubles the storage requirements. This can be somewhat alleviated using the approach illustrated in FIG. 7. The new H.264 video encoding standard includes the concept of 'Generalized B-frames'. These are different from traditional B-frames in two respects: they may be used as reference frames for other B-frames and the two prediction vectors may both point in the same direction (e.g., two backwards prediction vectors). Both of these differences are exploited in the approach shown in FIG. 7.

Figure 7:
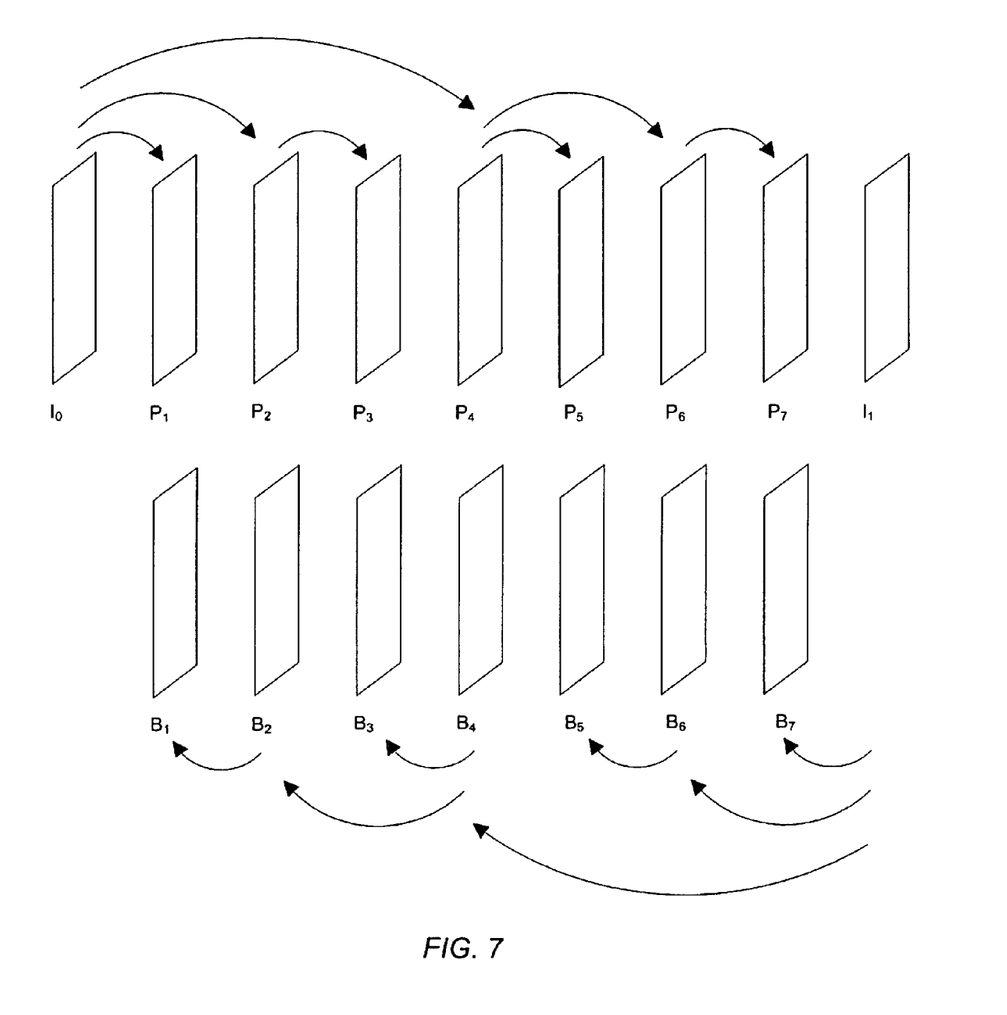
FIG. 7 illustrates a sequence of frames encoded in a hierarchical manner that enables (power of 2) multi-speed playback in both forward and reverse directions.

The top row of FIG. 7 shows an encoding pattern that is identical to that shown in FIG. 3. The bottom row of FIG. 7 shows a second encoded version of each of the P-frames in the top row. This second version is a generalized B-frame, where both motion predictors use a future frame (i.e., they are backward predicted). These B-frames use the same hierarchical encoding pattern as the reverse encoded bitstream in the previous example.

The advantage of the approach in FIG. 7 over the regular two-stream approach is that storage space is reduced since I-frames are stored only once. Also, because the two streams are contained in the same file, the overhead associated with File Headers and stream metadata is reduced.

In video encoding standards where the syntax prohibits having multiple versions of the same frame, the pattern shown in FIG. 7 can still be used: for instance, the even frames may be encoded as shown in the top row of FIG. 7 while the odd frames can be encoded as shown in the bottom row.

Note that the forward predicted frames shown in the top of FIG. 7, as well as the ones shown in FIG. 3 and FIG. 6 can just as easily be 'Generalized B-frames' as well as P-Frames. This is because in standards, such as H.264, which use Generalized B-Frames, the only difference between the two is the use of one vs. two motion vectors.

Figure 8A:
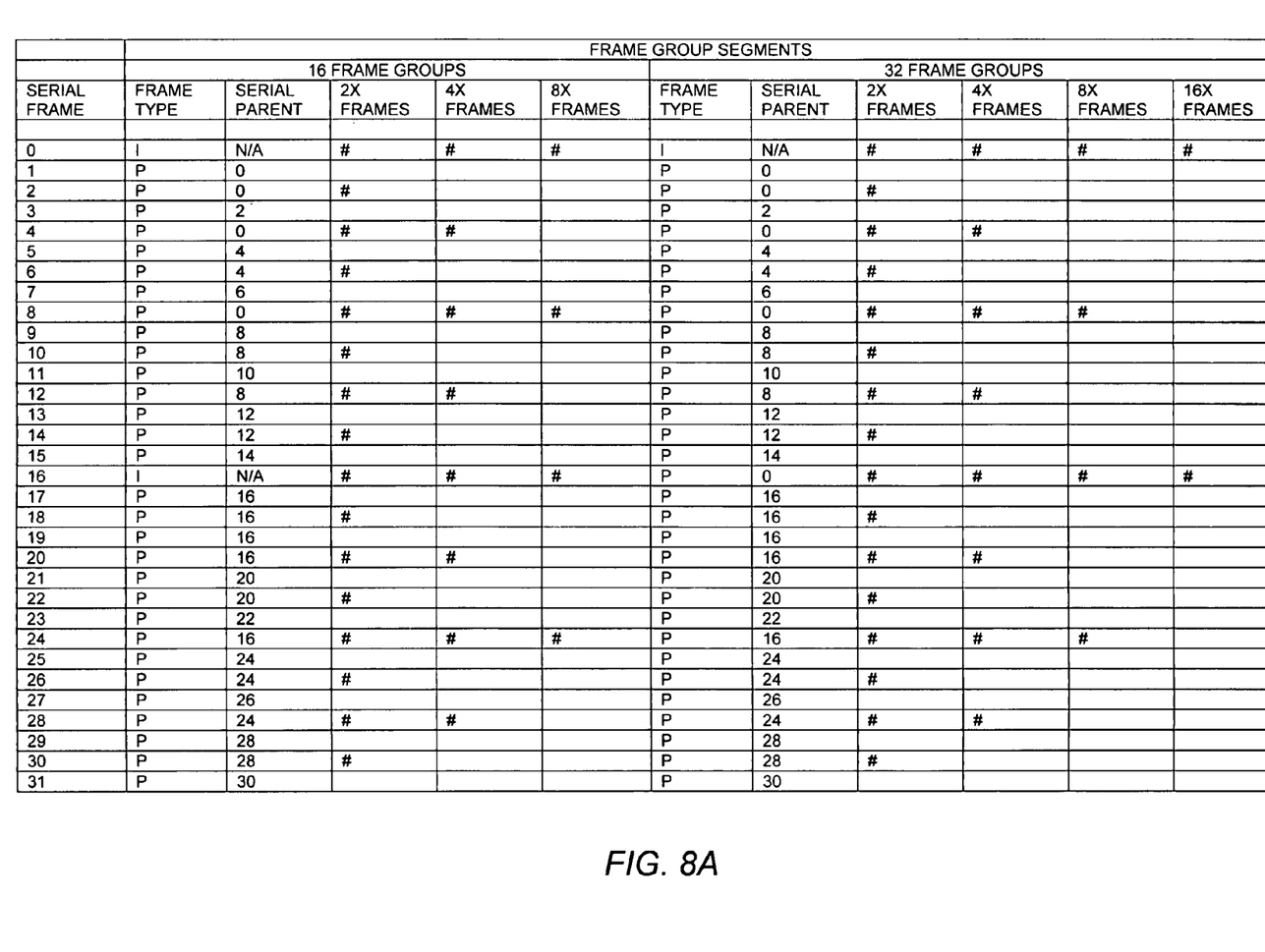
FIGS. 8A and B constitute a table showing the relationship among frames in a clip or group of frames, encoded with a hierarchy according to one embodiment of the invention.
Figure 8B:
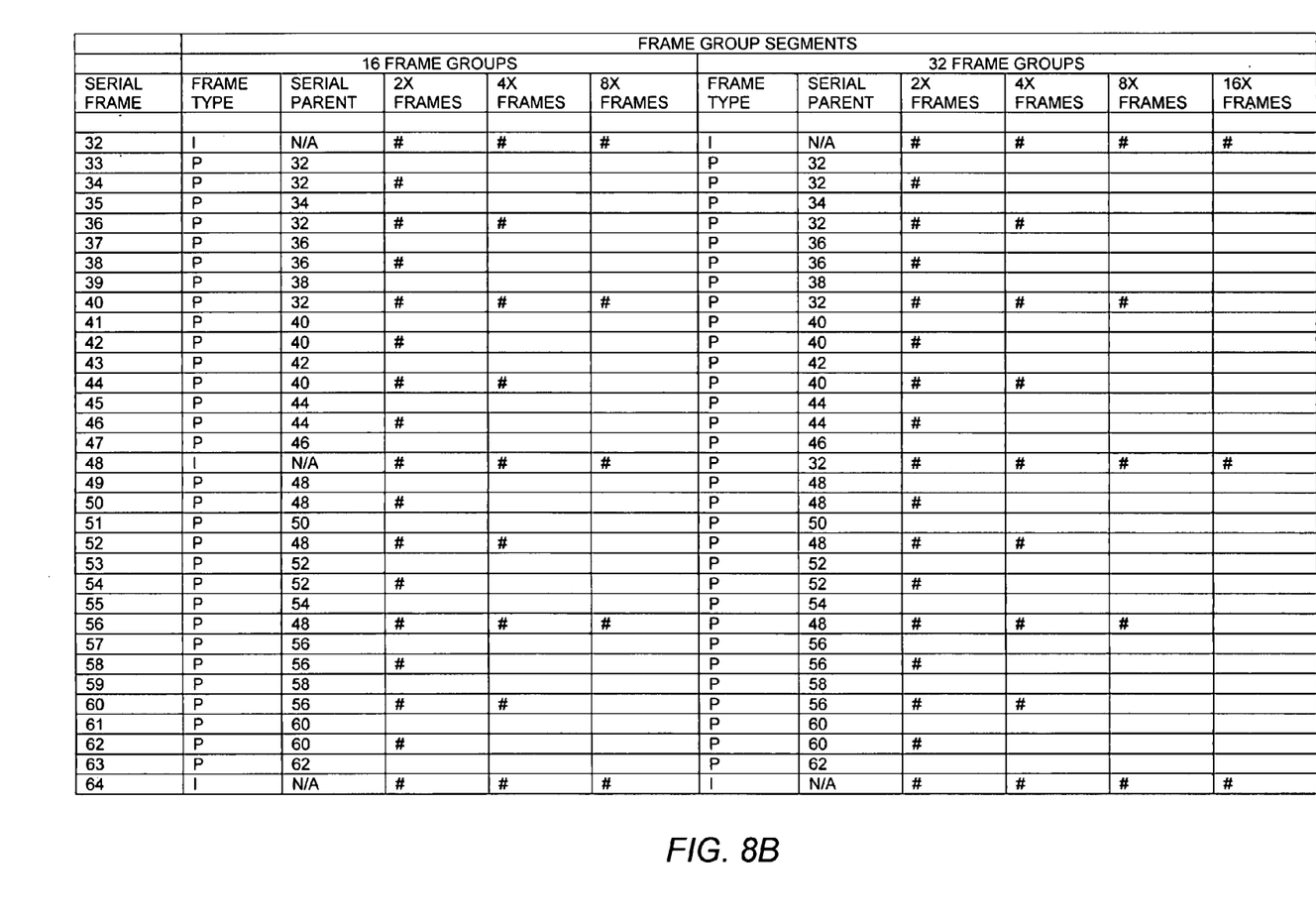

As an alternative description and explanation of one embodiment of the invention, attention is directed to FIG. 8, which shows a representative hierarchical relationship of grouped picture frames. The first column identifies a clip having serial frame numbers from 0 through 64, as a common base for describing the invention first with respect to a group segment having 16 frames per group, and then for a group segment having 32 frames per group.

With respect to the 16 frame group, the Frame Type column identifies whether the serial frame will be encoded as an I or a P type frame. The next column indicates the relationship for the particular P-Frame type, to the serial frame parent (reference). The next three columns indicate which of the encoded frames in the Frame Type Column will be transmitted or displayed in, e.g., a fast forward mode of 2×, 4× or 8× the original. The same breakdown of frame type, serial parent, and 2×, 4×, 8×, and then 16× nominal or normal speed, is also shown for the 32 frame groupings. The inventive concept can be illustrated by looking first at a high multiple of the basic fast forward speed of 2×.

In the example of the 16 frame groups, it is a straightforward matter to run the frames at the normal speed with every serial frame displayed. At a display rate of eight times normal (the 8× rate) use is made of only serial frames 0, 8, 16, 24, 32, 40, etc. Thus, P-Type frames corresponding to serial frames 8, 24, 40, must all be available. In order to be available for the 8× speed, these P-Type frames must have a parent that is likewise used at the 8× speed. In this example serial frames 8, 24, 40, and the like must have an I-Frame as a parent.

Similarly, the frames available for 4× speed must be either an I-Type or a P-Type that has a parent that is also to be displayed at the 4× speed. In the illustrated example, these include I-Type serial frame 0, with serial frames 4 and 8 derived from serial parent 0, and serial frame 12 derived from serial frame 8.

For the 2× rate, it is a relatively trivial matter to ignore all of the odd serial frames, but the even serial frames do not necessarily depend on the previous even frame, because of the precedence of the necessity for the parent relationships associated with the 4× and 8× rates.

For extremely fast playback rates, only the I frames, or I frames for which the serial number is a multiple of, e.g., 2, 4, etc., can be displayed.

It should also be appreciated that due to the more flexible nature of B-frames in H.264 (as compared to previous standards), the second column of the table may also include B frames (where currently P-frames are shown) with the restriction that both motion vectors must obey the same hierarchical relationship that applies to the single motion vector in P-frames. Indeed this flexible nature of B-frames (combined with the noted restriction) is exploited to enable fast speeds in the reverse direction.

Thus, one of ordinary skill in this field could readily construct a table similar to FIG. 8 for fast reverse direction, or for a hierarchical relation based on a power other than 2.

The same logic can be extended to the 32-frame group. In essence, any serial frame that must be present for a given increased speed must be an I-Type frame or a P-Type that depends on an I-Type or other P-Type that is also used in that speed.

The table can also be considered as representative of the collection of encoded frames as stored on a server. With reference again to FIG. 2, the raw video is a series (clip) of uncompressed pixel images 102 having color related properties. This video clip may or may not be stored in the uncompressed condition for some end use purposes, but the present invention is concerned only with the clip as stored in a compressed (encoded) condition 112. The encoding is achieved with the encoder 100, which in general relates images to each other not only in terms of parent identification (reference frame) but also in terms of compensation for relative changes (e.g., motion) in relation to its reference frame. For a cyclic or periodic segment of 32 frames, when playback is at normal speed, all frames 0-31 of each segment will be decoded and displayed from the encoded image file 112, not merely replayed from the raw image file 102. That is why all the odd numbered serial frames in the table of FIG. 8 must be encoded, even though none is a reference frame and they can simply be dropped out for 2× and faster speed without regard to any hierarchical relation. The server stores serial frame 0 as an I frame and every serial frame 1-31 as predicted from a reference (parent 1, P, or in some instances B or IDR (Intra Dynamic Refresh)) frame for a pattern that repeats every 32 frames. The period (of I-frames and therefore the pattern) could be any power of 2, or even powers of other integers.

The base level (needed for normal play) of the reference pyramid contains as reference frames, the encoded I frame and all the encoded even serial frames between 2 and 30. The second level (needed for 2×FF) contains the I frame and serial frames 4, 8, 12, 16, 20, 24, and 28 (for the first 32-frame GOP). For the next level (4× FF), the reference frames are 0, 8, 16, 24, and for the next level (8× FF) the reference frames are 0 and 16.

The relationship between the Serial Number of a frame and that of its parent can be expressed mathematically as follows for the case where the GOP size is a power of 2:

Let the GOP size be given by $2^P$.

Let FSN designate the Frame Serial Number and PSN the Parent Serial Number.

If FSN modulo $2^P=0$ then the frame is an I-frame and has no parent.

Otherwise, If $FSN=2^{k+1}n+2^k$, then $PSN=2^{k+1}n$.

Where n is a positive integer and k is an integer in the range [0,P−1].

For instance, if P=4, then the GOP size is 16, and the above mathematical expression can be explicitly written as follows: If FSN modulo 16=0, the frame is an I-frame. Otherwise:

| FSN | PSN |
|---|---|
| 2n + 1 | 2n |
| 4n + 2 | 4n |
| 8n + 4 | 8n |
| 16n + 8 | 16n |

The present invention has been described in particular detail with respect to various embodiments, and those of skill in the art will appreciate that the invention may be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms that implement the invention or its features may have different names, formats, or protocols. Second, the system may be implemented via a combination of hardware and software, as described, or entirely in hardware elements. Third, the particular division of functionality between the various system components described herein is merely exemplary, and not mandatory; functions performed by a single system component may instead be performed by multiple components, and functions performed by multiple components may instead be performed by a single component.

Some portions of above description describe the invention in terms of algorithms and symbolic representations of operations on information. These algorithmic descriptions and representations are the means by those skilled in the data processing arts to most effectively convey the substance of their work to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware or hardware.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed:

1. A method of encoding an ordered series of frames to form a video stream, said method comprising:
    encoding a first sequence of frames which is a subset of said series so that each frame in the first sequence is predicted from an immediately preceding reference frame and/or an immediately succeeding reference frame;
    encoding a second sequence of frames which is a subset of said series so that each frame in the second sequence is predicted from one or more frames other than an immediately preceding or an immediately succeeding reference frame and no frame in said second sequence is predicted from any frame in said first sequence;
    selecting said second sequence; and
    displaying said second sequence, or a subset of said second sequence to form either a fast forward or reverse playback of said video stream.

2. The method of claim 1, wherein said frames of said first sequence or said second sequence is every other frame of said ordered series of frames.

3. The method of claim 1, wherein said frames of said first sequence or said second sequence is an integral multiple of the frames of said ordered series.

4. The method of claim 1, further comprising transmitting said selected frames at a multiple or natural transmission rate of said ordered series of frames.

5. A method of encoding a video stream comprising an ordered series of reference frames having forward and backward predicted frames, said method comprising:
    encoding said reference frames and said predicted frames into a single bitstream having first and second sequences of forward predicted frames and first and second sequences of backward predicted frames, each frame in said first sequence of forward predicted frames is predicted from an immediately preceding reference frame and each frame in said second sequence of forward predicted frames is predicted from one or more frames other than an immediately preceding reference frame, no frame in said second sequence of forward predicted frames being predicted from any frame in said first sequence of forward predicted frames, each frame in said first sequence of backward predicted frames is predicted from an immediately succeeding reference frame and each frame in said second sequence of backward predicted frames is predicted from a frame other than an immediately succeeding reference frame, no frame in said second sequence of backward predicted frames being predicted from any frame in said first sequence of backward predicted frames;
    selecting said second sequence of forward predicted frames or said second sequence of backward predicted frames from said bitstream; and
    displaying said selected sequence to form either a fast forward or reverse playback of said video stream.

6. The method of claim 5, wherein:
    a single sequence of reference frames are used to predict both said first and second sequences of forward and backward predicted frames; and
    storing said single sequence of reference frames only once.

7. A method in a system including a server computer having a stored series of compressed video images for a video clip originally captured without compression at a nominal frames per second rate and encoded for compressed transmission through a data communications network for playback at said nominal frames per second rate to produce a display at a basic fast forward or fast reverse speed or a multiple thereof by a remote client connected to the network, comprising:
    storing the video clip in a digital file on the server as an encoded series of compressed video frames in a cyclic pattern of frame groups, each group consisting of an intra-coded (I) frame followed by a contiguous sequence of predicted frames derivable from a reference frame that is either an I frame or another predicted frame, wherein the reference frames include at least a first and second sequence of predicted frames, each frame in said first sequence predicted from an immediately preceding reference frame and/or an immediately succeeding reference frame, each frame in said second sequence is predicted from one or more frames other than an immediately preceding or an immediately succeeding reference frame, no frame in said second sequence is predicted from any frame in said first sequence and said first and second sequences of predicted frames have a hierarchical relation with each other that depends on said basic fast forward speed;
    sending a request from the client to the server for a bitstream of encoded images to be displayed at the client at the basic fast speed or a multiple thereof;
    transmitting a bitstream consisting of said second sequence of predicted frames or a subset thereof from the server to the client, commensurate with the display speed requested by the client;
    decoding the transmitted bitstream at the client; and
    playing the decoded bitstream at the nominal frames per second rate to produce a display at the requested basic fast speed or a multiple thereof.

8. A method of encoding a video stream comprising an ordered series of frames, said method comprising:
    encoding the frames in the ordered series as a plurality of hierarchical layers, each said layer representing a level of temporal resolution and having a temporal distance between all frames within each said layer, wherein a first layer includes all the frames in the ordered series and is the finest level of temporal resolution, each frame in a second layer and all subsequent layers being directly predicted from frames in the same layer or frames from a layer having a coarser temporal resolution, and where the temporal distance between all frames within the same layer is constant;
    skipping layers of frames to create a sequence of frames; and
    displaying said sequence of frames to form either a fast forward or fast reverse playback of said video stream.

9. The method of claim 8, wherein said second layer contains every other frame of said first layer.

10. The method of claim 8, wherein said second layer contains every other frame of said first layer and each subsequent layer contains every other frame of the previous layer.

* * * * *